United States Patent [19]

Colwell et al.

[11] 3,888,973

[45] June 10, 1975

[54] METHOD OF INCREASING THE SPEED OF CHEMICAL REACTION BETWEEN LIQUID AND SOLID REACTANTS USING CENTRIFUGAL FORCE

[75] Inventors: Robert E. Colwell, Palos Park; William A. Liegois, Palos Hills; Gerald W. Wilks, Grays Lake; Mihailo J. Vrcelj, La Grange Park, all of Ill.

[73] Assignee: Continental Can Company, Inc., New York, N.Y.

[22] Filed: Oct. 24, 1972

[21] Appl. No.: 300,071

[52] U.S. Cl. ............... 423/493; 423/150; 423/659; 75/97; 75/108; 204/48
[51] Int. Cl. ........................................... C01g 49/10
[58] Field of Search ....... 423/493, 659, 150; 23/269

[56] References Cited
UNITED STATES PATENTS

| | | | |
|---|---|---|---|
| 952,484 | 3/1910 | Vervuert | 23/269 |
| 1,284,488 | 11/1918 | Steward | 23/269 UX |
| 2,010,756 | 2/1935 | Genter | 423/493 |
| 2,209,577 | 7/1940 | Podbielniak | 23/269 UX |
| 2,523,800 | 9/1950 | Woodson | 23/269 X |
| 2,762,700 | 9/1956 | Brooks | 423/493 X |
| 3,019,079 | 1/1962 | Donohue | 423/659 |
| 3,595,623 | 7/1971 | Sperti | 23/269 |

Primary Examiner—Edward Stern
Attorney, Agent, or Firm—Paul Shapiro; Joseph E. Kerwin; William A. Dittmann

[57] ABSTRACT

The speed of chemical reaction between liquid and solid particle reactants is materially increased by a process wherein the reactants are charged to a rotating chamber provided with perforated sidewalls, the size of the perforations being less than the size of the particles. The particles are propelled against the walls of the chamber under the action of a centrifugal force created by the rotation of the chamber and are caused to form a continuous layer of particles on the walls of the chamber. The liquid reactant under the action of the same centrifugal force is caused to be propelled into contact with the particle layer and move radially therethrough to react chemically with the particles. The reaction products are then discharged from the chamber through the perforations in the sidewalls.

In a preferred embodiment of the invention, spent iron electrolyte solutions withdrawn from iron plating baths are regenerated by centrifugally contacting the electrolyte with a bed of iron particles centrifugally fixed on the perforated sidewalls of a rotating reaction chamber.

10 Claims, 2 Drawing Figures

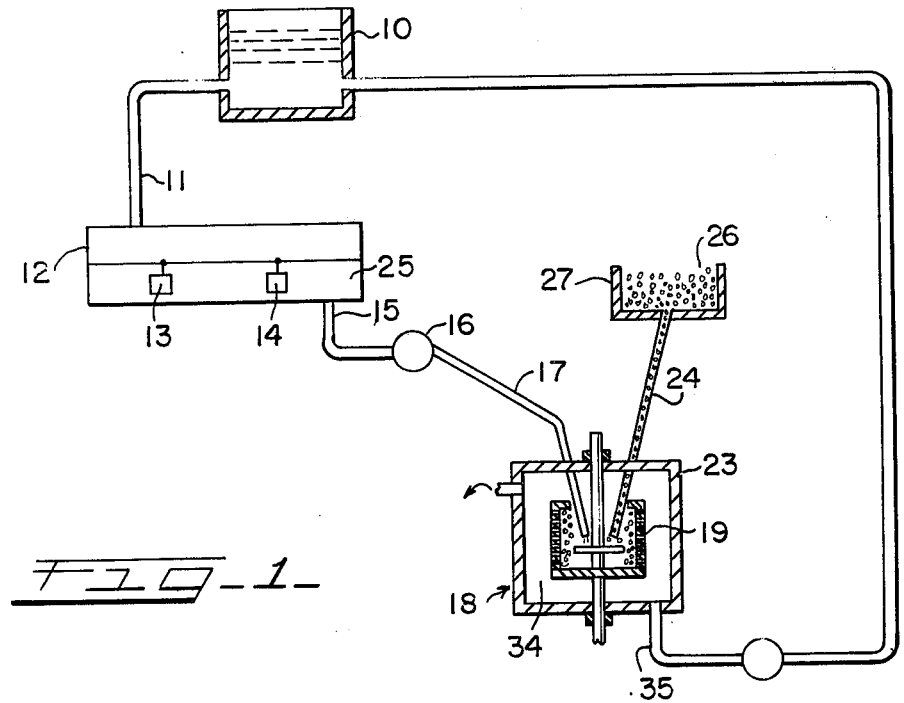
FIG-1-
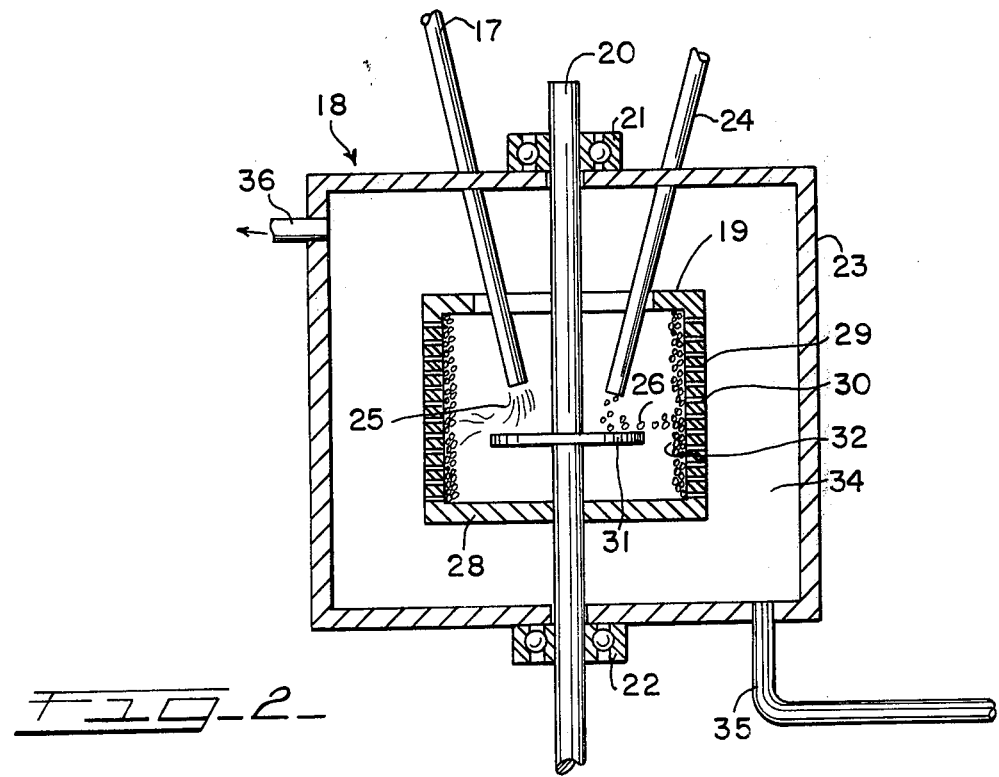
FIG-2-

METHOD OF INCREASING THE SPEED OF CHEMICAL REACTION BETWEEN LIQUID AND SOLID REACTANTS USING CENTRIFUGAL FORCE

BACKGROUND OF THE INVENTION

1. Field of the Invention

The present invention is directed to the chemical reaction of liquid and solid particles and more particularly to the chemical regeneration of spent $FeCl_2$ electrolyte solutions using iron particles.

2. The Prior Art

Processes are known to the art whereby liquid reactants are caused to chemically react with solids in particulate form by passing the liquid reactant through a bed of solid particle reactants by gravity or hydrostatic pressure. In industrial applications where the commercial success of a process may be dependent upon the speed at which a chemical reaction occurs, the rate of chemical reaction between a reactant in liquid form and a solid in particulate form, performed in accordance with these prior art processes may not be rapid enough to justify the commercialization of the process.

The present invention provides a method for effecting a chemical reaction between a liquid and a solid in particulate form whereby the speed of the reaction is materially increased by effecting the reaction under the influence of centrifugal force.

For purposes of illustration, the invention claimed herein will be described with specific reference to the regeneration of spent iron plating electrolyte solutions with iron particles, but it will be understood that the process of the present invention is generally applicable to any chemical reaction involving liquid and solid particulate reactants.

It is well known to the art as for example, U.S. Pat. Nos. 1,412,174, 1,862,745, 2,223,928, 2,316,917, 2,420,403 and U.S. Pat. No. 2,758,950 to electroplate iron articles such as sheets, foil, strips, tubes and the like wherein the iron is plated from an electroplating bath onto a suitably shaped cathode. Typically, the electroplating is accomplished with a highly concentrated $FeCl_2$ solution. In the electroplating of iron using $FeCl_2$ solutions, the cathode reaction is represented by the equation, $FeCl_2 + 2e \rightarrow Fe^o + 2 Cl^-$ and the anode reaction by the equation $2 FeCl_2 + 2 Cl^- - 2e^- \rightarrow 2 FeCl_3$ The commercial applications of electroplating iron structures are readily apparent. The direct production of iron sheet, tubes or containers from iron plating baths would replace the capital and energy costs of the blast furnaces, rolling mills and shaping equipment presently required for the production of these iron articles. Utilizing scrap iron derived from discarded automobiles, metal containers and the like would permit recycling of these materials and thereby alleviate the serious ecological problem of solid waste disposal with which our nation is presently confronted.

Although it has been long known that iron can be deposited from its solutions by electrolysis and the commercial aspects of iron electroplating readily apparent, the process has been little used except in the building up of undersized parts and in the production of high purity iron.

One problem encountered in the electroplating of iron articles which has retarded the commercial application of the process is that the plating reaction rapidly depletes $Fe^{2+}$ from the electrolyte and fresh electrolyte must be continuously fed to the electrolytic bath. The efficient preparation of fresh electrolyte is a complex engineering and handling problem.

One method of regenerating the spent electrolyte is to circulate the spent electrolyte over iron scrap in a regeneration tank to prepare $FeCl_2$ and to reduce any $FeCl_3$ in the electrolyte to $FeCl_2$ in accordance with the following equations:

1. $Fe^o + 2HCl \rightarrow FeCl_2 + H_2\uparrow$
2. $2 FeCl_3 + Fe^o \rightarrow 3 FeCl_2$ The process of the present invention provides a simple means to regenerate spent iron electrolyte solutions in accordance with the above equations. As will hereinafter be immediately apparent, although the process of present invention is highly useful for regenerating spent iron electrolyte solutions, the process of the present invention is useful in increasing the rate of any chemical reaction involving liquid and solid particle reactants.

SUMMARY OF THE INVENTION

In accordance with the present invention, there is provided a process for increasing the rate of reaction between chemical reactants in liquid and solid particle forms wherein the reactants are charged to a rotating reaction chamber having sidewalls provided with a plurality of openings, the openings being of a size which is smaller than the size of the solid particles charged to the chamber. The chamber is rotated at a speed sufficient to cause the solid particles to be propelled outwardly under the influence of centrifugal force against the sidewalls of the chamber and to be fixed thereon to form a continuous bed of particles. The liquid reactant charged to the chamber is propelled outward into contact with the particle bed and is caused to contact and move radially therethrough under the action of the same centrifugal force which fixes the particles on the chamber sidewalls. As the liquid reactant passes through the particle bed it reacts with the particle bed at a rate substantially faster than would occur in the absence of the propelling centrifugal force. The chemical reaction products of the liquid and solid particle reactants exit the chamber through the sidewall openings.

DESCRIPTION OF THE DRAWINGS

FIG. 1 is a diagrammatic illustration of a system utilizing the process of the present invention.

FIG. 2 is an elevational view, in vertical section, schematically showing the essential construction and arrangement of a centrifugal apparatus suitable for use in the practice of the present invention.

PREFERRED EMBODIMENTS

The process of the present invention will hereinafter be illustrated by a particularly preferred embodiment thereof, namely the regeneration with iron particles of spent $FeCl_2$ electrolyte solutions containing excessive amounts of $FeCl_3$, wherein the iron particles are representative of the solid particle reactant, the spent electrolyte solution is representative of the liquid reactant and the chemical reaction being the dissolution of a metal with an acid to form the metal salt of the acid as well as a reduction reaction wherein salt having a metallic cation is reacted with a reducing agent to reduce the salt to a compound in which the valence of the metallic cation is lowered.

Electrolyte solutions conventionally employed in iron plating include ferrous salts such as $FeSO_4$, $FeCl_2$ and mixtures of $FeCl_2$ and $CaCl_2$. In addition to ferrous salts, a small percentage of $Fe^{3+}$ in the electrolyte is preferred. Satisfactory results have been obtained by maintaining the ferric iron concentration at 0.01 grams per liter (g/l) of electrolyte solution to 5 g/l and a concentration of 0.1 g/l being typical. The total molar concentration of metal ion in the electrolyte charged to the electrolytic cell used for the iron plating is generally in the range of 2 to 5 moles (M). When using these electrolyte solutions, the pH of the solution is maintained between 0.2 and 4.

During plating, the temperature of the electrolyte bath is maintained at 90°C and above and generally in the range of 105° to 115°C.

Iron plating is accomplished at a current density of 1 to 5 amperes/in$^2$ and at these current densities, the rate of iron deposition is between 0.14 to 0.70 mils/minute. At these deposition rates the $FeCl_2$ content of the electrolyte is rapidly depleted and the concentration of $FeCl_3$ is quickly raised to an excessive amount. To maintain a continuous plating operation, electrolyte solution containing the proper balance of $FeCl_2$ and $FeCl_3$ must be continuously circulated to the electrolytic plating cell and spent electrolyte withdrawn from the cell at least before an excessive concentration of $Fe^{3+}$ has accumulated therein.

To continuously resupply the electrolytic cell with fresh electrolyte and to minimize electrolyte chemical handling and disposal, the spent electrolyte withdrawn from the cell is regenerated in accordance with the process of the present invention and then returned to the cell. As is required, the regenerated electrolyte may be filtered or otherwise treated to remove dissolved and undissolved contaminants that may be present in the regenerated electrolyte before the electrolyte is returned to the cell.

As the free acid content of the electrolyte withdrawn from the electrolytic cell may be lowered as a result of the dissolution - reduction reaction caused by contact of the spent electrolyte with iron particles and by volatilization at the temperatures used in the regeneration process, it will be necessary, periodically or continuously to replace the loss of the free acid by the suitable addition of free acid. Replacement of lost acid may be effected by introducing the required acid directly into the electrolyte in the electrolytic cell or into the spent electrolyte which has been withdrawn from the cell before the regeneration operation. Preferably, however, the replacement of acid is done between stages of regeneration to prevent the formation of insoluble ferric species.

Referring now to FIG. 1, an aqueous HCl solution containing $FeCl_2$ and a minor amount of $Fe^{3+}$ is prepared and supplied to electrolyte supply tank 10. From the tank 10, the electrolyte solution is conducted by pipe 11 into electrolytic cell 12, comprised of a cathode 13 and an anode 14. The electrolytic cell is energized by a source of DC (not shown). At a position in the cell remote from the inlet pipe 11, is provided an outlet pipe 15 by which spent electrolyte is withdrawn from cell 12. The outlet pipe 15 leads to a pump 16 which in turn, is adapted to deliver the spent electrolyte through liquid inlet pipe 17 into centrifugal reactor 18. The centrifugal reactor 18, shown in greater detail in FIG. 2, contains an open top basket reaction chamber 19 operatively connected to a rotable vertical shaft 20 which is mounted in bearings 21, 22 and is driven by a power source (not shown). A casing 23 encloses the basket reaction chamber 19. Solids inlet pipe 24 provides means whereby iron particles 26 of a predetermined size are charged to the basket 19 from a supply unit 27.

The open-top basket reaction chamber 19 is formed of a bottom plate 28 and a cylindrical perforated side walls 29 having a plurality of spaced openings 30 which are smaller in size than the size of the iron particles 26 fed to the basket. The perforated walls of the basket 19 are parallel to the axis of rotation of the basket 19. Mounted on vertical shaft 20 within the basket interior is distributor plate or disc 31. As the basket 19 is caused to rotate about its vertical axis by the rotation of the shaft 20, the iron particles supplied to the basket 19 are continuously propelled radially outward toward and onto the perforated walls of the chamber by the centrifugal force exerted thereon as soon as the particles reach the rotating disc 31, and being of a size larger than the wall openings, the particles cannot penetrate the wall and remain vertically fixed thereto as a continuous layer or bed of particles 32. However, as the iron particles react with the electrolyte 25 centrifugally impinged thereon, the particles are reduced in size and are caused to wash through the openings 30 and pass out from the chamber 19, thereby avoiding excessive build-up of bed resistance. The spent electrolyte 25 entering the basket 19 through inlet 17 upon impingement on the rotating disc 31 is thrown radially outward against the particle bed 32 fixed to the wall 29 by the centrifugal force generated by the rotating basket. When the basket 19 is rotated at a speed which generates sufficient centrifugal force to keep the particles 26 in fixed vertical alignment with the walls 29 of the basket 19, this same centrifugal force causes the liquid electrolyte to move radially through the bed 32. As the electrolyte moves through the bed 32, a portion of the iron particles is converted to $FeCl_2$ by reaction with the HCl electrolyte 25 and the $FeCl_3$ dissolved in the electrolyte is rapidly reduced to $FeCl_2$ by reaction with the iron particle bed. As reaction of the bed with the electrolyte 25 also causes rapid attrition of the particle bed, iron particles are continuously fed to the reactor 18 at a predetermined rate to replace the iron particles consumed by the electrolyte-iron particle reaction. The liquid electrolyte feed rate and rotational speed of the basket 19 are generally selected so that only a fraction of the interstitial pore volume of the bed is filled with liquid electrolyte at any given time, and flooding of the bed is thereby avoided.

At a constant liquid feed rate, the bed fillage can be readily reduced by increasing the basket rotational speed.

The depth of the particle bed 32 fixed on the wall 29 generally is dependent on the basket diameter. Preferably the bed depth measured in the radial direction will not exceed about one quarter the basket diameter and will generally range from 0.15 to 0.20 of the basket diameter. For example, an eight inch diameter basket operating at optimum rotation will typically have a 1.5 inch bed depth. Bed depths less than about 0.15 of the basket diameter result in reduced capacities for the reactor and are not preferred.

After being propelled through the particle bed 32, the regenerated electrolyte, comprised of substantially reduced concentrations of $Fe^{3-}$ and increased concentrations of $FeCl_2$, is continuously expelled by the action of the centrifugal force from the reaction chamber 19 through the spaced openings 30 in the side wall 29 and enters the chamber 34 formed between the casing 23 and the reaction chamber 19. The regenerated electrolyte flows downwardly through the chamber 34 by gravity and is discharged from the chamber 34 through outlet 35 provided in the bottom of the chamber 34.

Any gaseous reaction products formed during the reaction of the electrolyte with the particle bed, being lighter than the electrolyte, become separated from the electrolyte in the chamber 34 and are removed from the chamber 34 through gas outlet 36 to a suitable collection means (not shown).

The regenerated electrolyte discharged from the chamber 34 through the outlet 35, may be recycled through the same or a series of similar centrifugal reactors if more complete reduction of the $Fe^{3+}$ ion is desired or the regenerated electrolyte may be immediately purified to remove contaminants and pumped directly into electrolyte supply means 10 and then charged to the electrolytic cell 12 to provide fresh electrolyte for the iron plating reaction.

It is an essential and critical feature of the process of the present invention that a centrifugal force be used to fix and maintain a bed of solid reactant particles on the perforated walls of a rotating reaction chamber and that the liquid reactant, to be reacted therewith, be also propelled into contact with the bed and move radially through the bed of reactive solid particles under the action of centrifugal force. As will hereinafter be illustrated, the time required to obtain a reduction in the $Fe^{3+}$ concentration in a spent $FeCl_2$—HCl electrolyte withdrawn from an iron plating bath when using centrifugal force in accordance with the present invention is substantially less than the time required with reactors not operating at centrifugal speeds.

The high rates of iron dissolution and $Fe^{3+}$ reduction obtained in accordance with the process of the present invention are believed due to the high Reynolds Number achieved by propelling the spent electrolyte through a bed of iron particles by centrifugal force.

For example, the reduction of $FeCl_3$ to $FeCl_2$ with iron particles is believed to be a first order heterogenous reaction represented by the equation.

$(C/C_o) = e^{-B\Theta}$,

Where e = natural logarithm base, 2.718,
$\theta$ = time,
C = concentration of reactant at time $\theta$,
$C_o$ = initial concentration of reactant and
B = reaction rate constant Thus, as represented by the above equation, for a given first order heterogenous reaction, the higher the value of B, the more rapid is the reaction rate.

The value of B can be determined from experimental data. B can also be predicted from the expression, $$B = f\left[F_A, (\rho_b/\rho_s), N_{Sc}, N_{Re}, \frac{(D)}{tDp}\right]$$

where, $F_A$ is a measure of the ratio of solid surface per unit of liquid reactant and the availability of this surface for reaction with the liquid phase, $(\rho_b/\rho_s)$, is the ratio of the bulk density of the solid to its solid density, $N_{Sc}$, the Schmidt Number, is the ratio of the kinematic viscosity of the liquid to the diffusity of the reacting liquid, $N_{Re}$, is the Reynolds Number and $(D/tDp)$ is a dimensional parameter for which D is the liquid diffusivity, t is the solid particle thickness and $D_p$ is the solid particle characteristic diameter.

It has been determined experimentally that in a reaction involving turbulent flow between solid particles and liquids, the value of B will depend on the Reynolds Number to about the two-thirds power, that is the higher the Reynolds Number the more rapid the reaction between the solid and the liquid reactants.

The Reynolds Number is proportional to the ratio of inertial forces to viscous forces and is represented by the expression, $$N_{Re} = D_p \bar{v}/\nu$$

where, $D_p$ is the solid particle diameter, $\bar{v}$ is the fluid velocity past the solid particles and $\nu$ is the kinematic viscosity of the fluid.

In the process of the present invention high Reynolds Numbers and therefore high reaction rates are obtained for the reaction between a reactant in liquid form such as $FeCl_3$ dissolved in a liquid electrolyte and a solid particle reactant such as iron particles, due to the fact that the centrifugal force at which the liquid reactant is propelled through the bed of solid particles raises $\bar{v}$ to values which are appreciably higher than that achieved in conventional batch reaction processes where the liquid reactant is caused to flow or circulate through a bed of solid reactant particles by gravity or by mechanical agitation of the heterogeneous reactants.

The Reynolds Number and hence the rate of reaction is further beneficially enhanced by operating at the boiling point of the electrolyte. Thus it is well known that increasing the temperature of the reactants results in an increase in the reaction rate. In the regeneration of spent iron plating solutions in accordance with the process of the present invention, operation at or near the boiling point of the electrolyte is especially desirable since this is approximately the temperature of the solution leaving the electrolytic cell and therefore is preferred.

To obtain increased reaction speed in accordance with the process of the invention, the reaction chamber is rotated at a centrifugal acceleration of about 1 to about 200 times the gravitational acceleration (G), with a centrifugal acceleration of 5 to 50 G being preferred. Excessive acceleration, that is, accelerations greater than 200 G should be avoided, as such acceleration may cause compaction of the particulate bed, increasing its resistance to a level wherein fluid flow rate through the bed is marginal.

The speed at which the reaction chamber is rotated to attain the desired centrifugal force depends upon the diameter of the basket 19. This force varies directly with the distance from the center of rotation.

The gravitational acceleration of the rotating basket 19 can be determined by the mathematical equation, $$G = \frac{2\pi^2 D N^2}{(3600)(g)}$$

where,
D = diameter in feet of the basket,
N = revolutions per minute (rpm) and
g 32 32.2 ft./sec$^2$, nominal gravitational acceleration.

The following examples are given to illustrate the practice of the process of the present invention.

EXAMPLE I

A centrifugal reactor of the type shown schematically in FIG. 2 of the accompanying drawings was used to react iron particles with a solution representative of a spent FeCl$_2$ plating solution having a Fe$^{2+}$ concentration of 72 g/l and a Fe$^{3+}$ concentration of 46 g/l dissolved in an aqueous solution adjusted to a pH of 0.1 with HCl.

The reaction chamber was an open top 8 inch diameter fiberglass (l/m). plastic basket 19 having 2 inch high vertical walls perforated throughout with holes spaced one-third inch apart having a diameter of 3/16 inch. A 14 mesh screen covered the inside wall of the basket. The basket was charged with about 2,000 grams of shredded iron particles having a particle size range of 0.1–0.3 centimeters (cm), a thickness of about 0.015 cm and an apparent density of 2 grams/cm$^3$. The basket 19 was rotated at 205 rpm about its vertical axis. The solution, at a temperature of 103°C, was pumped into the basket at a rate of 18 liters/minute (1/m). Iron particles were continuously charged to the rotating basket at a rate sufficient to maintain about a 2,000 gram iron particle inventory in the basket. Due to the centrifugal force, a bed of iron particles about 1.5 inches in depth became fixed on the walls of the basket. The centrifugal force on the walls of the basket were determined to be about 4.8 G. Upon contact with the disc 31 of the rotating apparatus, solution pumped to the basket was propelled through the iron particle bed by the action of centrifugal force and then passed through the perforated basket walls into a collection chamber. Vapors were passed through a water cooled condenser and collected.

The iron particle reacted solution was removed from the collection chamber and disharged into a storage tank. The solution collected in the storage tank was then returned to a feed tank for additional passes through the centrifugal reactor. The residence time for each successive solution pass through the iron particle bed fixed on the walls of the basket was determined to be no greater than 1.5 seconds. Analysis of the electrolyte passed through and regenerated in the reactor is recorded in Table I below.

TABLE I

| Pass | Fe$^{3+}$ Concentration, g/l Solution | |
|---|---|---|
| | In* | Out |
| 1 | 46 | 17 |
| 2 | 24 | 6.6 |
| 3 | 6.2 | 2.7 |

TABLE I-Continued

| Pass | Fe$^{3+}$ Concentration, g/l Solution | |
|---|---|---|
| | In* | Out |
| 4 | 2.9 | 1.9 |
| 5 | 2.0 | 0.9** |

* Residual material containing Fe$^{3+}$ in the tanks and piping used to convey the electrolyte solutions is believed to account for the higher Fe$^{3+}$ concentrations in the solutions being returned to the reactor than those discharged from the reactor.

** The Fe$^{2+}$ concentration was increased to 160 g/l and the total contact time for 5 passes was less than 8 seconds.

EXAMPLE II

The procedure of Example I was repeated except that the solution feed rate was increased to 28.5 l/m and the basket speed was 309 rpm for a centrifugal force of 10.8 G. The initial Fe$^{2+}$ concentration was 107 g/l and the initial Fe$^{3+}$ concentration was 45.1 g/l.

Analysis of the electrolyte successively passed through the basket is recorded in Table II below.

TABLE II

| Pass | Fe$^{3+}$ Concentration, g/l Solution | | Fe$^{2+}$ Concentration, g/l Solution | |
|---|---|---|---|---|
| | In | Out | In | Out |
| 1 | 45.1 | 19.2 | 107 | 146 |
| 2 | 19.2 | 8.3 | 146 | 170 |
| 3 | 9.3 | 4.83 | 170 | 178 |
| 4 | 4.98 | 2.80 | 178 | 181 |
| 5 | 3.10 | 1.70* | 181 | 185 |

* Total contact time was less than 5 seconds.

EXAMPLE III

The procedure of Example I was repeated except that the initial Fe$_2^+$ concentration was 137 g/l, the basket speed 401 rpm, and the liquid feed rate 25.4 l/m. The G force was about 18.4 at the basket wall. Analysis of the electrolyte successively passed through the basket is recorded in Table III below.

TABLE III

| Pass | Fe$^{3+}$ Concentration, g/l Solution | | pH | |
|---|---|---|---|---|
| | In | Out | In | Out |
| 1 | 36.3 | 12.5 | 0.1 | 0.2 |
| 2 | 17.1 | 9.24 | 0.2 | 0.5 |
| 3 | 9.52 | 5.78 | 0.4 | 0.7 |
| 4 | 6.23 | 3.92 | 0.5 | 0.8 |
| 5 | 4.90 | 2.60* | — | — |

* The Fe$^{2+}$ concentration was increased to 214 g/l and total contact time was less than 5 seconds.

EXAMPLE IV

The procedure of Example I was repeated except that the initial Fe$^{2+}$ concentration was about 89 g/l, and the Fe$^{3+}$ was 37.3 g/l. The solution feed rate was 26.4 l/m and the basket speed 404 rpm. The G force at the basket wall was about 18.6. Analysis of the electrolyte successively passed through the basket is recorded in Table IV.

TABLE IV

| Pass | Fe$^{3+}$ Concentration, g/l Solution | |
|---|---|---|
| | In | Out |
| 1 | 37.3 | 10.1 |

TABLE IV-Continued

| Pass | $Fe^{3+}$ Concentration, g/l Solution | |
|---|---|---|
| | In | Out |
| 2 | 12.3 | 5.5 |
| 3 | 6.5 | 3.2 |
| 4 | 3.57 | 1.57 |
| 5 | 1.81 | 0.81 |
| 6 | 0.90 | 0.46 |
| 7 | 0.52 | 0.28* |

* The $Fe^{2+}$ concentration was increased to 168 grams/liter and the total contact time was less than 7 seconds.

For purposes of comparison, the reaction of $FeCl_2$ solution with iron particles was attempted in which a centrifugal basket reactor was not used.

In this comparative run, a batch reactor was used. The batch reactor was comprised of a three neck, one liter round bottom glass flask equipped with a 2 inch wide segmental agitator positioned about 1/16 inch from the bottom hemisphere of the flask, a water cooled reflux condenser and means for adding and removing $FeCl_2$ solution and iron particles from the flask. The agitator speed was 70 rpm and caused the iron particles to be moved through the $FeCl_2$ solution.

The initial electrolyte composition was 60 g/l, $Fe^{3+}$, 30 G/l, $Fe^{2+}$, and the pH was adjusted to 0.2 with HCl. The electrolyte was heated to 103°C, and 50 grams of iron particles were charged to the reactor. At predetermined time intervals the regenerated electrolyte was removed from the flask using mild suction. Analysis of the electrolyte after regeneration is recorded in Table V below.

TABLE V

| Run Number | Elapsed Contact Time (sec.) | $Fe^{3+}$ Concentration g/l Solution |
|---|---|---|
| 1 | 60 | 6.36 |
| 2 | 90 | 3.84 |
| 3 | 120 | 1.66 |
| 4 | 180 | 0.38 |
| 5 | 240 | 0.11 |

* The $Fe^{2+}$ concentration was increased to 128 g/l.

While the embodiments disclosed hereinabove have been directed to the dissolution of iron with acid solutions and the reduction of $Fe^{3+}$ with iron particles, the invention is not so limited. Those skilled in the art will perceive that the method of centrifugally contacting a liquid reactant with a particulate solid reactant fixed on perforated wall by centrifugal force will have equal application in any heterogeneous liquid-particulate solid reaction such as the cementation of copper from metallurgical leach liquors, the precipitation of tellurium from electrolytic refining slimes, the reprocessing of spent nuclear reactor fuels, and to accelerate the leaching of various ores.

What is claimed is:

1. A process for effecting a heterogeneous chemical reaction between a first reactant in a solid, particulate phase and a second reactant in a liquid phase comprising the steps of
   charging the solid, particulate reactant to a reaction chamber having a plurality of openings in its sidewalls, the size of the openings being smaller than the size of the solid particulate reactant,
   rotating the chamber with sufficient rotational speed to generate a centrifugal force to cause the solid particulate reactant to be propelled outwardly against the walls of the chamber and be fixed thereon to form a continuous bed of solid particulate reactant,
   charging the second reactant to the rotating chamber, the second reactant being propelled outward into contact with the bed of solid particulate reactant fixed on the walls of the chamber and caused to move radially therethrough under the action of centrifugal force, the second reactant during its passage through the solid particulate layer entering into chemical reaction with the solid particulate layer and then
   collecting the chemical reaction product expelled from the chamber through the openings therein.

2. The process of claim 1 wherein the first reactant is consumed during the chemical reaction.

3. The process of claim 2 wherein the first reactant is a metal and the reaction product is a salt of the metal.

4. The process of claim 2 wherein the first reactant is iron, the second reactant is a solution of $FeCl_3$ and the reaction product is $FeCl_2$.

5. The process of claim 1 wherein the second reactant is a liquid solution of a salt having a metallic cation and the first reactant is a reducing agent capable of reducing the salt to a compound in which the valence of the metallic cation is lowered.

6. The process of claim 5 wherein the liquid salt solution is a solution containing $FeCl_3$ dissolved therein and the reducing agent is metallic iron.

7. The process of claim 1 wherein the reaction chamber is rotated at a speed sufficient to propel the reactants charged to the chamber against the walls thereof under the action of a centifugal force having an acceleration of more than 1 to 200 times that of gravitational acceleration.

8. The process of claim 7 wherein the centrifugal force has an acceleration of 5 to 50 times that of gravitational acceleration.

9. The process of claim 1 wherein the bed depth measured radially is less than one quarter of the chamber diameter.

10. A process for effecting a heterogeneous chemical reaction between iron in a solid, particulate phase and a solution containing $FeCl_3$, comprising the steps of
    charging iron particles to a reaction chamber having a plurality of openings in its sidewalls, the size of the openings being smaller than the size of the iron particles,
    rotating the chamber about its vertical axis with sufficient rotational speed to generate a centrifugal force having an acceleration of more than 1 to 200 times that of gravitational acceleration to cause the particles to be propelled outwardly against the walls of the chamber and be fixed thereon to form a continuous bed of particles having a depth measured radially of less than one quarter of the chamber diameter,
    charging a solution containing $FeCl_3$ to the rotating chamber, the $FeCl_3$ containing solution being propelled outward into contact with the iron particle bed fixed on the walls of the chamber and caused to move radially therethrough under the action of centrifugal force, the $FeCl_3$ containing solution during its passage through the iron particle layer entering into chemical reaction with the iron particles to consume the iron particles and form $FeCl_2$ and then
    collecting the solution containing the $FeCl_2$ reaction product expelled from the chamber through the openings therein.

* * * * *